United States Patent
Ushimaru et al.

(10) Patent No.: US 9,453,534 B2
(45) Date of Patent: Sep. 27, 2016

(54) TAPERED ROLLER BEARING

(71) Applicant: NSK LTD., Tokyo (JP)

(72) Inventors: Satoshi Ushimaru, Fujisawa (JP); Takashi Murai, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/763,223

(22) PCT Filed: Jan. 23, 2014

(86) PCT No.: PCT/JP2014/051422
§ 371 (c)(1),
(2) Date: Jul. 24, 2015

(87) PCT Pub. No.: WO2014/115821
PCT Pub. Date: Jul. 31, 2014

(65) Prior Publication Data
US 2015/0369289 A1  Dec. 24, 2015

(30) Foreign Application Priority Data

Jan. 25, 2013 (JP) ................................. 2013-012418
Dec. 27, 2013 (JP) ................................. 2013-273050

(51) Int. Cl.
*F16C 33/46* (2006.01)
*F16C 33/36* (2006.01)
(Continued)

(52) U.S. Cl.
CPC ............... *F16C 33/46* (2013.01); *F16C 19/36* (2013.01); *F16C 19/364* (2013.01);
(Continued)

(58) Field of Classification Search
CPC .... F16C 33/46; F16C 33/366; F16C 19/364; F16C 2240/54
USPC ................................. 384/564–565, 571–572
See application file for complete search history.

(56) References Cited

U.S. PATENT DOCUMENTS 4,425,011 A * 1/1984 Cunningham ........ F16C 19/364
384/571
4,462,643 A * 7/1984 Gilbert ............... G16C 33/4635
384/548

(Continued)

FOREIGN PATENT DOCUMENTS

CN      102171468 A    8/2011
CN      102741573 A   10/2012
(Continued)

OTHER PUBLICATIONS

International Search Report for PCT/JP2014/051422 dated Apr. 8, 2014 [PCT/ISA/210].

(Continued)

*Primary Examiner* — Marcus Charles
(74) *Attorney, Agent, or Firm* — Sughrue Mion, PLLC

(57) ABSTRACT

A cage 20 of a tapered roller bearing 1 holds tapered rollers 30 by plural pockets formed between a large-diameter side annular part 22 and a small-diameter side annular part 23 arranged in an axial direction, and plural bar parts 24 which axially join the large-diameter side annular part 22 and the small-diameter side annular part 23 and are circumferentially formed at substantially an equal distance. A value of a ratio of a cross section modulus of the small-diameter side annular part 23 of the cage 20 to a cross section modulus of the large-diameter side annular part 22 of the cage 20 is values from 0.5 to 1.5 (both inclusive).

3 Claims, 10 Drawing Sheets

(51) Int. Cl.
*F16C 19/36* (2006.01)
*F16C 33/66* (2006.01)
*F16C 33/54* (2006.01)

(52) U.S. Cl.
CPC ........ *F16C 33/366* (2013.01); *F16C 33/4623* (2013.01); *F16C 33/54* (2013.01); *F16C 33/66* (2013.01); *F16C 33/6614* (2013.01); *F16C 33/6651* (2013.01)

(56) References Cited

U.S. PATENT DOCUMENTS

| | | | | |
|---|---|---|---|---|
| 4,664,537 | A * | 5/1987 | Ascheron | F16C 19/364 384/470 |
| 4,728,204 | A * | 3/1988 | Colanzi | B61F 15/12 384/576 |
| 6,022,148 | A * | 2/2000 | Back | F16C 33/4635 384/572 |
| 6,086,261 | A * | 7/2000 | Nakagawa | F16C 19/225 384/462 |
| 6,443,625 | B1 | 9/2002 | Nogi | |
| 8,382,380 | B2 * | 2/2013 | Nakamizo | F16C 19/364 384/571 |
| 2005/0213861 | A1 * | 9/2005 | Ono | F16C 19/364 384/571 |
| 2007/0041677 | A1 * | 2/2007 | Masuda | F16C 19/225 384/571 |
| 2007/0133914 | A1 * | 6/2007 | Matsuyama | F16C 19/163 384/470 |
| 2007/0230851 | A1 * | 10/2007 | Matsuyama | F16C 19/354 384/565 |

FOREIGN PATENT DOCUMENTS

| | | | | |
|---|---|---|---|---|
| CN | 102834631 A | | 12/2012 | |
| EP | 1770294 A1 | * | 4/2007 | ............ F16C 19/364 |
| JP | 2004-263877 A | | 9/2004 | |
| JP | 2006-322017 A | | 11/2006 | |
| JP | 4026292 B2 | | 12/2007 | |
| JP | 2008039142 A | * | 2/2008 | ............ F16C 33/66 |
| JP | 2012-013134 A | | 1/2012 | |

OTHER PUBLICATIONS

Written Opinion for PCT/JP2014/051422 dated Apr. 8, 2014 [PCT/ISA/237].
Notification of the First Office Action issued on Nov. 3, 2015 by the State Intellectual Property Office of PR China in related Application No. 201480000709.X.

* cited by examiner

TAPERED ROLLER BEARING

CROSS-REFERENCE TO RELATED APPLICATIONS

This application is a U.S. national stage application under 35 USC 371 of International Application No. PCT/JP2014/051422 filed on Jan. 23, 2014, in the Japan Patent Office, which claims priority under 35 U.S.C. §119(a) to Japanese Patent Application No. 2013-012418 filed on Jan. 25, 2013 and Japanese Patent Application No. 2013-273050 filed on Dec. 27, 2013. Each of the above application(s) is hereby expressly incorporated by reference, in its entirety, into the present application.

TECHNICAL FIELD

The present invention relates to a tapered roller bearing.

BACKGROUND ART

Conventionally, in the case of assembling a tapered roller bearing, a tapered roller is first inserted from an inner peripheral surface of a cage and then, an inner ring is axially inserted. At this time, in order to prevent disassembly of the cage and the tapered roller, a bar part of the small-diameter side of the cage is deformed by tightening, and the tapered roller can be held by the cage and a small rib of the inner ring. Accordingly, the inner ring, the cage and the tapered roller form a non-separable integrated product and an outer ring is further assembled to thereby complete the tapered roller bearing.

However, when the bar part of the small-diameter side of the cage is deformed by tightening, dimensional accuracy may be decreased due to plastic deformation of the cage. As a result, various configurations of the tapered roller bearing capable of being assembled without tightening are proposed (for example, see Patent Documents 1, 2).

RELATED ART REFERENCE

Patent Document

Patent Document 1: Japanese Patent No. 4026292
Patent Document 2: JP-A-2012-13134

SUMMARY OF THE INVENTION

Problems to be Solved by the Invention

The tapered roller bearing shown in Patent Document 1 can be assembled without tightening by forming outside diameter shapes of an end face side outer peripheral surface and a raceway surface side outer peripheral surface of a small rib of an inner ring in elliptical shapes. However, the tapered roller bearing shown in Patent Document 1 has a problem of increasing a manufacturing cost due to processing in the shapes.

Also, the tapered roller bearing shown in Patent Document 2 can be assembled without tightening while preventing disassembly of a tapered roller and an inner ring, for example, by forming a part of a pocket of a cage in a deformed shape, forming a part of the tapered roller in a deformed tapered roller and putting a notch in a small rib of the inner ring. However, the tapered roller bearing shown in Patent Document 2 also has a problem of increasing a manufacturing cost due to processing in the deformed shape.

Also, the tapered roller bearing shown in Patent Document 2 has a problem that an attitude at the time of assembly does not become stable by diagonally inserting the inner ring.

The invention has been implemented in view of the circumstances described above, and an object of the invention is to provide a tapered roller bearing capable of being easily assembled without increasing a manufacturing cost.

Means for Solving the Problems

The object of the invention is achieved by the following configurations.

(1) A tapered roller bearing including:

an inner ring having a small rib in a small-diameter side, the inner ring whose outer peripheral surface is formed with a conical inner ring raceway surface, an outer ring whose inner peripheral surface is formed with a conical outer ring raceway surface, plural tapered rollers rollably circumferentially arranged between the inner ring raceway surface and the outer ring raceway surface, and a cage for holding the tapered rollers by plural pockets formed between a large-diameter side annular part and a small-diameter side annular part arranged in an axial direction, and plural bar parts which axially join the large-diameter side annular part and the small-diameter side annular part and are circumferentially formed at substantially an equal distance, wherein a value of a ratio of a cross section modulus of the small-diameter side annular part of the cage to a cross section modulus of the large-diameter side annular part of the cage is values from 0.5 to 1.5 (both inclusive).

(2) The tapered roller bearing according to the above (1), wherein the small-diameter side annular part of the cage has a curved part with a curved shape extending to a radial inside in a direction away from the bar part, and a radial distal end of the curved part is located on a radial outside beyond a central axis of the tapered roller.

(3) The tapered roller bearing according to the above (1) or (2), wherein arithmetic average roughness Ra of a rolling surface of the tapered roller is 0.05 μm or less.

Advantage of the Invention

According to the tapered roller bearing of the invention, easy assembly is enabled without increasing a manufacturing cost.

MODES FOR CARRYING OUT THE INVENTION

Each embodiment of a tapered roller bearing according to the invention will hereinafter be described in detail based on the drawings.

First Embodiment

Figure 1:
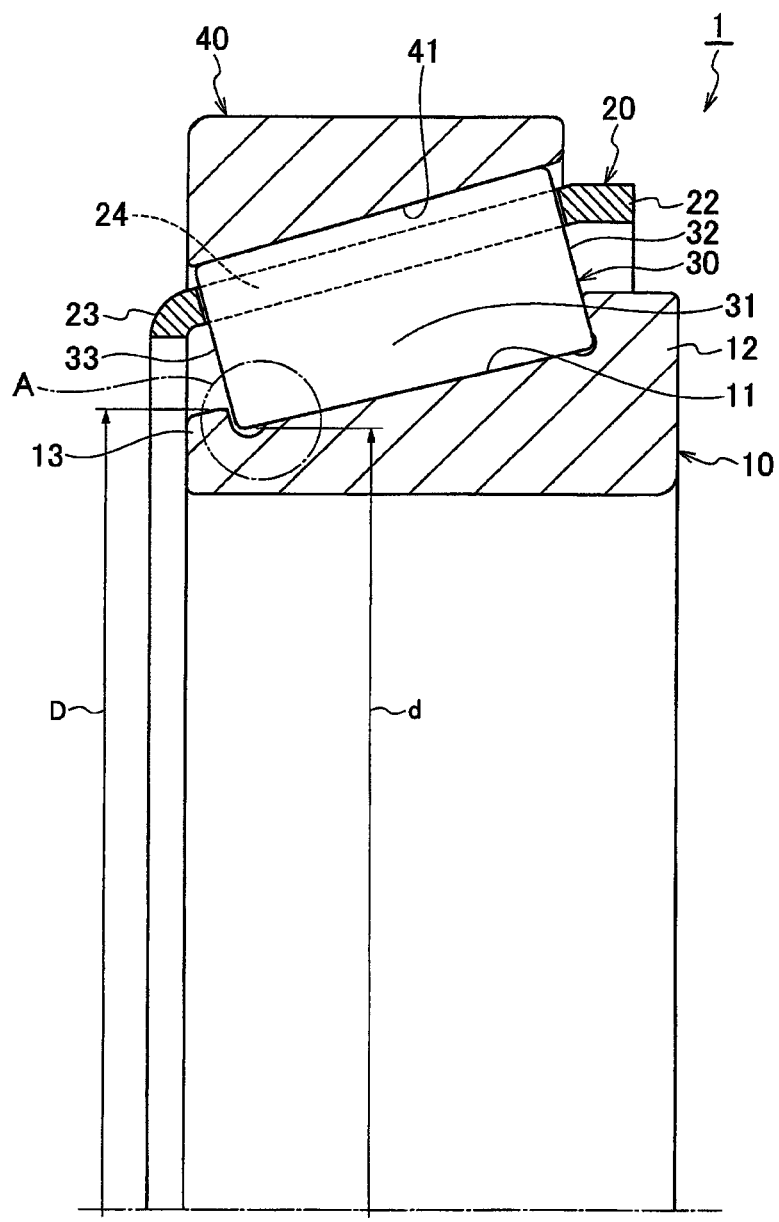
FIG. 1 is a sectional view of a tapered roller bearing according to a first embodiment of the invention.

A tapered roller bearing according to a first embodiment of the invention will be described with reference to FIGS. 1 to 7. FIG. 1 shows an axial cross section of a tapered roller bearing 1 including an inner ring 10, a cage 20, plural tapered rollers 30, and an outer ring 40.

The inner ring 10 is constructed of, for example, steel, and a conical inner ring raceway surface 11 is formed on an outer peripheral surface and also, the inner ring 10 has a large rib 12 in one end which is the large-diameter side, and a small rib 13 in the other end which is the small-diameter side. A conical outer ring raceway surface 41 is formed on an inner peripheral surface of the outer ring 40.

The cage 20 is constructed of, for example, a steel material, and has a large-diameter side annular part 22 and a small-diameter side annular part 23 axially arranged on a concentric circle, and plural bar parts 24 for joining the large-diameter side annular part 22 and the small-diameter side annular part 23. A pocket for receiving the tapered roller 30 is formed by the large-diameter side annular part 22, the small-diameter side annular part 23 and the two adjacent bar parts 24.

The tapered roller 30 has a large-diameter side end face 32 and a small-diameter side end face 33. The large-diameter side end face 32 and the small-diameter side end face 33 are on a concentric circle, and a rolling surface 31 with substantially a conical shape in which a diameter of a peripheral surface connecting both of the end faces is gradually decreased from the side of the large-diameter side end face 32 toward the side of the small-diameter side end face 33 is formed. The tapered rollers 30 are rollably held in the plural respective pockets of the cage 20 one by one.

Figure 9:
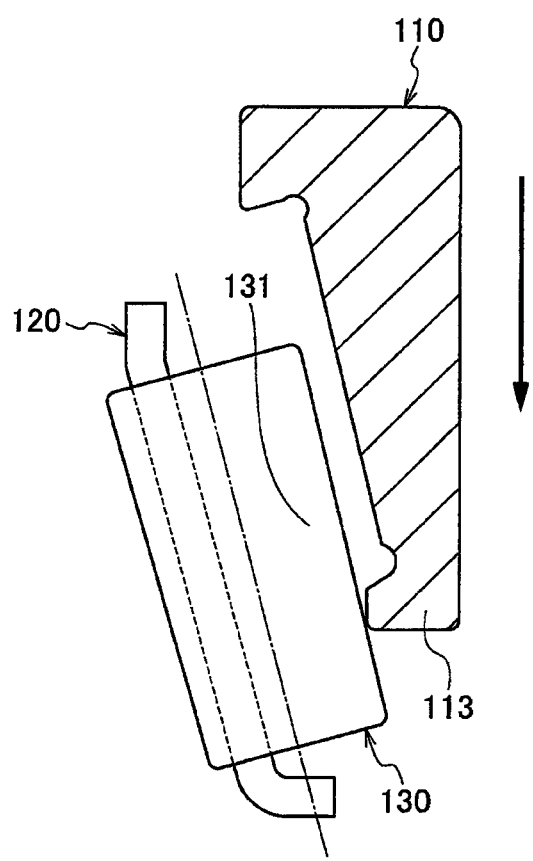
FIG. 9 is a diagram describing an assembly process of the conventional tapered roller bearing.

In the case of assembling the tapered roller bearing, the tapered roller is first arranged in each of the pockets of the cage. Next, the inner ring is pushed from the side of the large-diameter side annular part of the cage. At this time, the tapered roller is pushed to the radial outside by the inner ring, and in a conventional tapered roller bearing as shown in FIG. 9, a cage 120 for restraining a tapered roller 130 is not too deformed, with the result that it is difficult to insert an inner ring 110. Also, a small rib 113 of the inner ring 110 collides with a rolling surface 131 of the tapered roller 130 and thereby, the rolling surface 131 of the tapered roller 130 may be damaged.

Hence, in the tapered roller bearing 1 of the present embodiment, the cage 20 is formed so that a value of a ratio of a cross section modulus of the small-diameter side annular part 23 of the cage 20 to a cross section modulus of the large-diameter side annular part 22 of the cage 20 becomes values from 0.5 to 1.5 (both inclusive). The cage 20 is processed by, for example, a punch or a die, and dimensions capable of being adopted by the cage 20 have design constraints. It is difficult to manufacture the cage 20 in which the value of the ratio of the cross section modulus of the small-diameter side annular part 23 to the cross section modulus of the large-diameter side annular part 22 of the cage 20 becomes 0.5 or less. Also, since the cage 20 in which the value of the ratio becomes 0.5 or less has a narrow bottom surface part, a problem of accuracy arises. Consequently, a lower limit of the value of the ratio of the cross section modulus of the small-diameter side annular part 23 to the cross section modulus of the large-diameter side annular part 22 of the cage 20 is 0.5. Also, when the value of the ratio of the cross section modulus of the small-diameter side annular part 23 to the cross section modulus of the large-diameter side annular part 22 of the cage 20 is more than 1.5, rigidity of the small-diameter side annular part 23 becomes high and the amount of elastic deformation of the cage 20 in the case of inserting the inner ring 10 at the time of assembling the bearing is small, with the result that the tapered roller 30 may have a mounting flaw. Consequently, an upper limit of the value of the ratio of the cross section modulus of the small-diameter side annular part 23 to the cross section modulus of the large-diameter side annular part 22 of the cage 20 is 1.5. In addition, the value of the ratio of the cross section modulus of the small-diameter side annular part 23 to the cross section modulus of the large-diameter side annular part 22 of the cage 20 is more preferably values from 0.6 to 1.0 (both inclusive).

Figure 2:
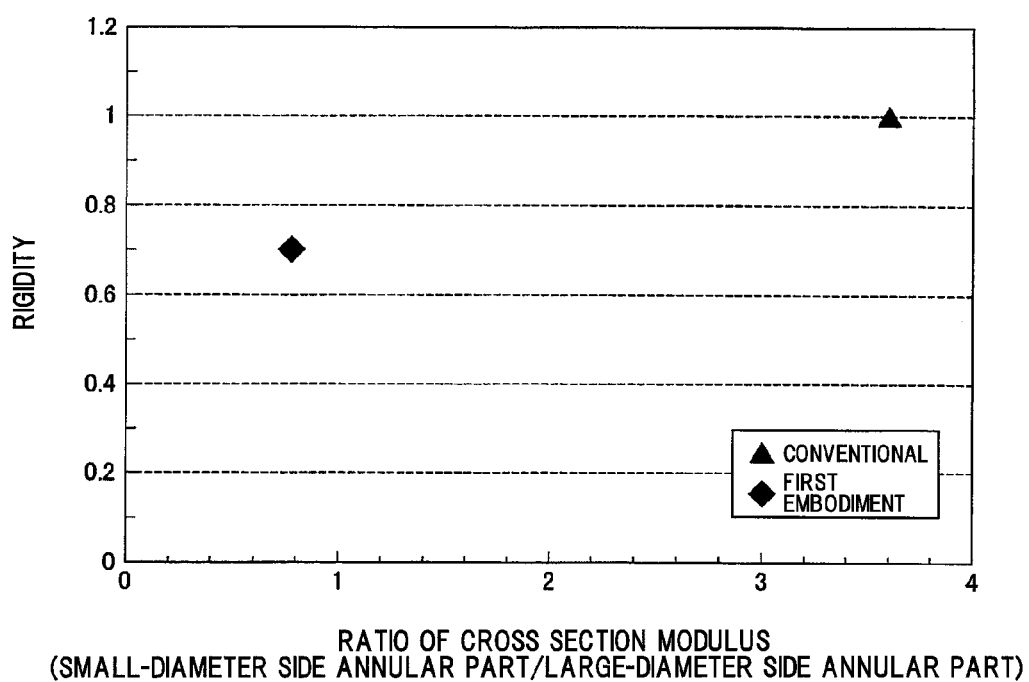
FIG. 2 is a diagram showing a relation between rigidity and a value of a ratio of a cross section modulus of a small-diameter side annular part to a cross section modulus of a large-diameter side annular part of a cage.

FIG. 2 is a diagram showing a relation between rigidity of the cage and the value of the ratio of the cross section modulus of the small-diameter side annular part to the cross section modulus of the large-diameter side annular part of the cage. In the tapered roller bearing 1 of the present embodiment (first embodiment) shown in FIG. 2, the value of the ratio of the cross section modulus of the small-diameter side annular part 23 to the cross section modulus of the large-diameter side annular part 22 is 0.76 (a value of 1.5 or less), the rigidity is 0.7 time that of the conventional tapered roller bearing. It is apparent from the results that the tapered roller bearing of the present embodiment can decrease a stress of the cage.

Here, in order to demonstrate an effect of the tapered roller bearing according to the present embodiment, drop impact tests were conducted using the conventional tapered roller bearing and the tapered roller bearing 1 according to the present embodiment. In the tests, single row tapered roller bearings (manufactured by NSK, product number HR30228J) with an inner ring bore diameter of 140 mm, an outer ring outside diameter of 250 mm and an assembled width of 45.75 mm having a conventional configuration (the conventional tapered roller bearing) and configurations of the present embodiment (tapered roller bearings A, B, C of the present embodiment) were used. In the tapered roller bearings A, B, C of the present embodiment, the values of the ratios of the cross section moduli of the small-diameter side annular parts 23 to the cross section moduli of the large-diameter side annular parts 22 of the cages 20 were set at 0.76, 1.04, 1.5, respectively. Also, in the conventional tapered roller bearing, the value of the ratio of the cross section modulus of the small-diameter side annular part to the cross section modulus of the large-diameter side annular part was set at 3.87. The tapered roller bearings were collided with a steel plate with an impact acceleration of 165G by forcedly dropping these tapered roller bearings, and it was checked that damage such as a failure or a crack to the tapered roller bearings (cages) was caused every time the tapered roller bearings were collided 100000 times.

Figure 3:
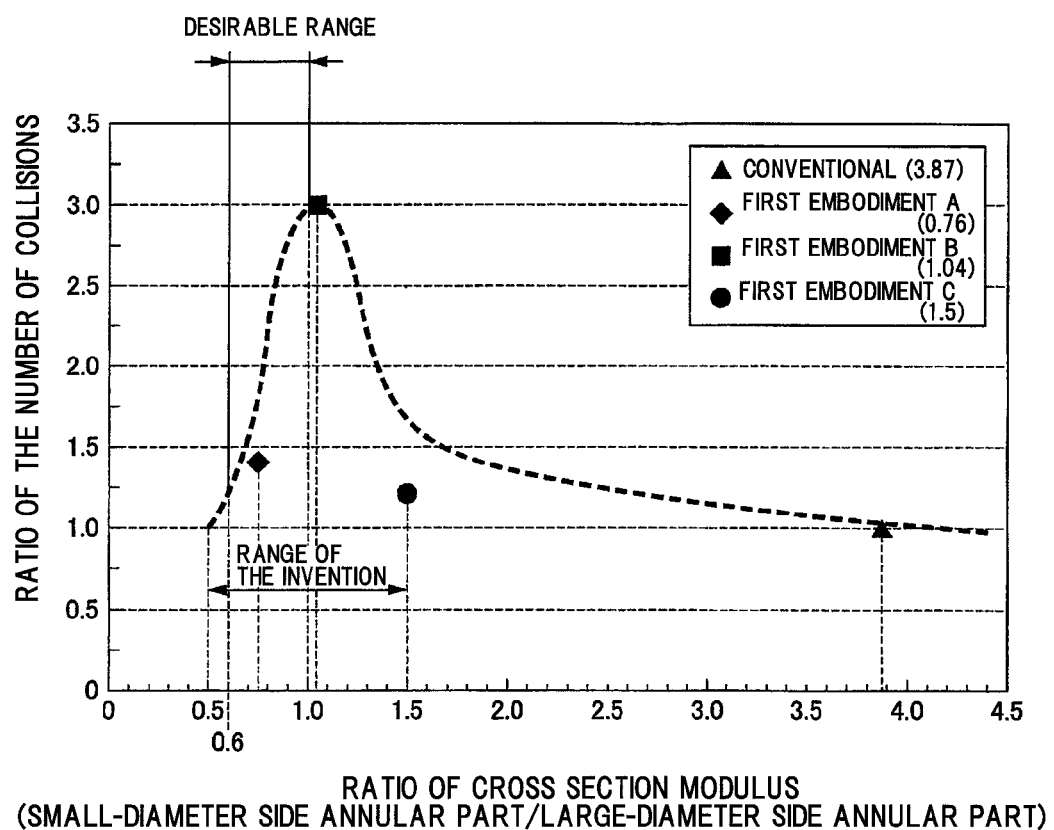
FIG. 3 is a diagram describing results of drop impact tests of the tapered roller bearing according to the first embodiment of the invention and a conventional tapered roller bearing.

FIG. 3 is a graph showing results of the drop impact tests. In FIG. 3, the number of collisions at a point in time of causing damage to the conventional tapered roller bearing is set at 1 and the number of collisions at a point in time of causing damage to each of the tapered roller bearings A, B, C of the present embodiment is shown by a ratio. It is apparent from FIG. 3 that strength of the tapered roller bearing A of the present embodiment in which the value of the ratio of the cross section modulus of the small-diameter side annular part 23 to the cross section modulus of the large-diameter side annular part 22 of the cage 20 is 0.76 is about 1.4 times that of the conventional tapered roller bearing. Similarly, it is apparent that strength of the tapered roller bearing C of the present embodiment in which the value of the ratio of the cross section modulus of the small-diameter side annular part 23 to the cross section modulus of the large-diameter side annular part 22 is 1.5 is about 1.2 times that of the conventional tapered roller bearing. Also, it is apparent that strength of the tapered roller bearing B of the present embodiment in which the value of the ratio of the cross section modulus of the small-diameter side annular part 23 to the cross section modulus of the large-diameter side annular part 22 is 1.04 is about 3 times that of the conventional tapered roller bearing. Thus, it is apparent that the strength of the cage 20 and therefore the strength of the tapered roller bearing 1 can be increased when the value of the ratio of the cross section modulus of the small-diameter side annular part 23 to the cross section modulus of the large-diameter side annular part 22 of the cage 20 is values from 0.5 to 1.5 (both inclusive) like the tapered roller bearing 1 according to the present embodiment.

Figure 4:
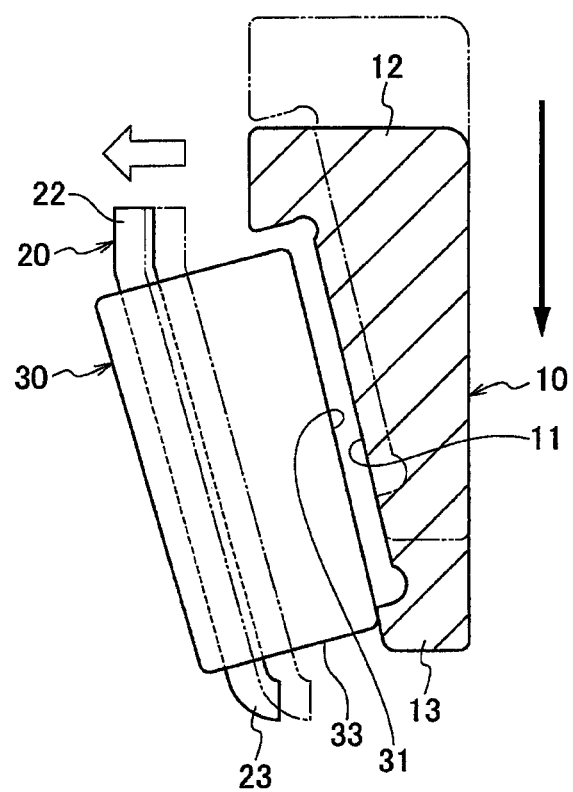
FIG. 4 is a diagram describing an assembly process of the tapered roller bearing of FIG. 1.

In the case of inserting the inner ring 10 at the time of assembling the tapered roller bearing 1 of the present embodiment, as the inner ring 10 is moved to the side of the small-diameter side annular part 23 of the cage 20 as shown in FIG. 4, the small rib 13 of the inner ring 10 makes contact with the rolling surface 31 of the tapered roller 30, and the tapered roller 30 is pressed to the radial outside by the small rib 13. Since the cage 20 of the present embodiment has a large amount of elastic deformation, the cage 20 pressed by the tapered roller 30 is elastically deformed to expand to the radial outside and thereby, the pocket is temporarily pushed out and the inner ring 10 can be inserted. A force necessary to insert this inner ring 10 becomes about 40% as compared with the conventional case and also, the inner ring 10 can be inserted perpendicularly to the axial direction, with the result that easy assembly is enabled.

Also, the tapered roller bearing 1 of the present embodiment is constructed so as not to disassemble the inner ring 10, the cage 20 and the tapered roller 30 by setting a relation between an outside diameter D of the small rib 13 and a bore diameter d of the roller at D>d. Accordingly, the need for tightening is eliminated and also, it is unnecessary to change a shape of the inner ring or the pocket, with the result that easy assembly is enabled without increasing a manufacturing cost. In addition to this, a crack in the cage 20 or damage to the tapered roller 30 can be prevented by setting interference (difference between the outside diameter D of the small rib 13 and the bore diameter d of the roller) at a proper value.

Figure 5:
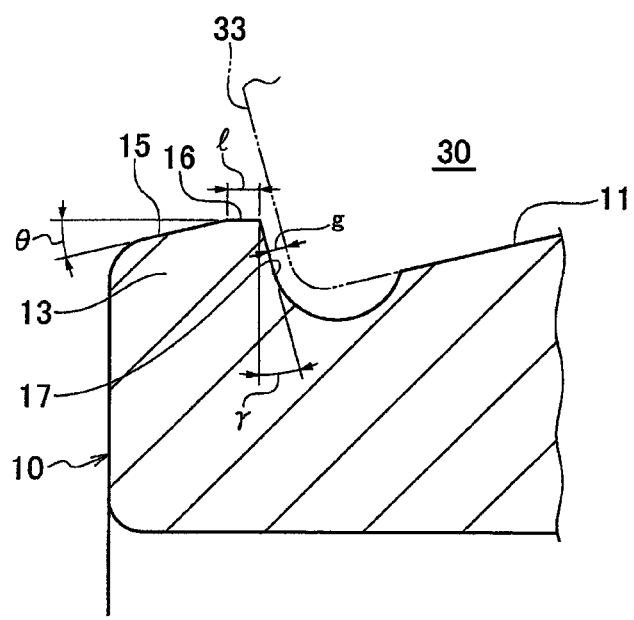
FIG. 5 is an enlarged view of part A of FIG. 1.

Also, as shown in FIG. 5, an outside surface 15 of the small rib 13 of the inner ring 10 is provided with a straight part 16. The straight part 16 is inclined at a contact angle θ with respect to the outside surface 15, and is formed so that an axial length 1 becomes 1 mm or less. Accordingly, insertability of the inner ring 10 can be improved more, and damage to the tapered roller 30 can be prevented.

Also, an axial inside end face 17 of the small rib 13 is inclined and formed at an angle γ so as to hold a proper clearance g between the axial inside end face 17 of the small rib 13 and the small-diameter side end face 33 of the tapered roller 30. Accordingly, the tapered roller 30 can be prevented from overhanging the small rib 13 of the inner ring 10 to be separated after assembly of the inner ring 10, the cage 20 and the tapered roller 30.

Figure 10:
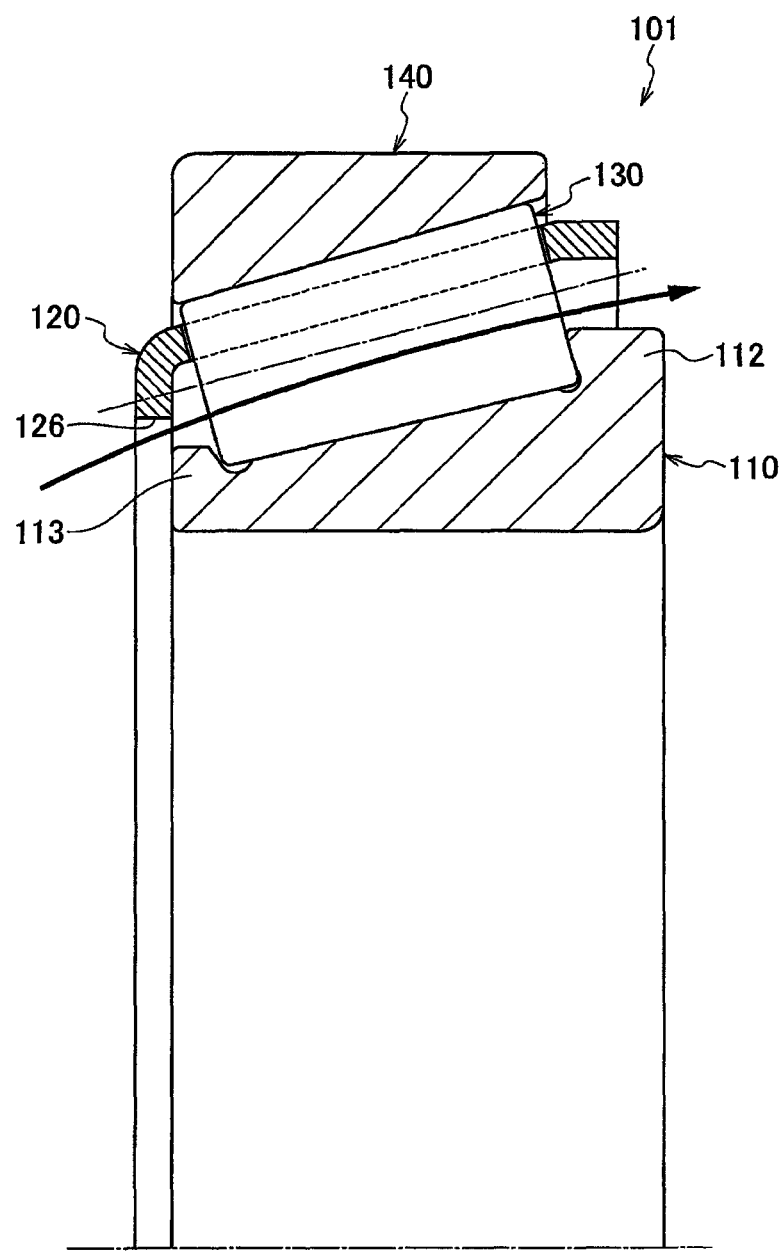
FIG. 10 is a diagram describing a flow of a lubricant in the conventional tapered roller bearing.

Incidentally, the tapered roller bearing is generally lubricated by oil bath or grease lubrication. At this time, in the conventional tapered roller bearing as shown in FIG. 10, a small-diameter side annular part 122 of the cage 120 extends to the radial inside, and a clearance between a radial end face 126 of the small-diameter side annular part 122 and an outside surface of the small rib 113 is small. Such a structure has a problem of increasing agitation resistance due to an increase in a lubricant of the inside of the bearing since it is difficult to discharge an extra lubricant from the small-diameter side while introducing the lubricant from the small-diameter side.

Figure 6:
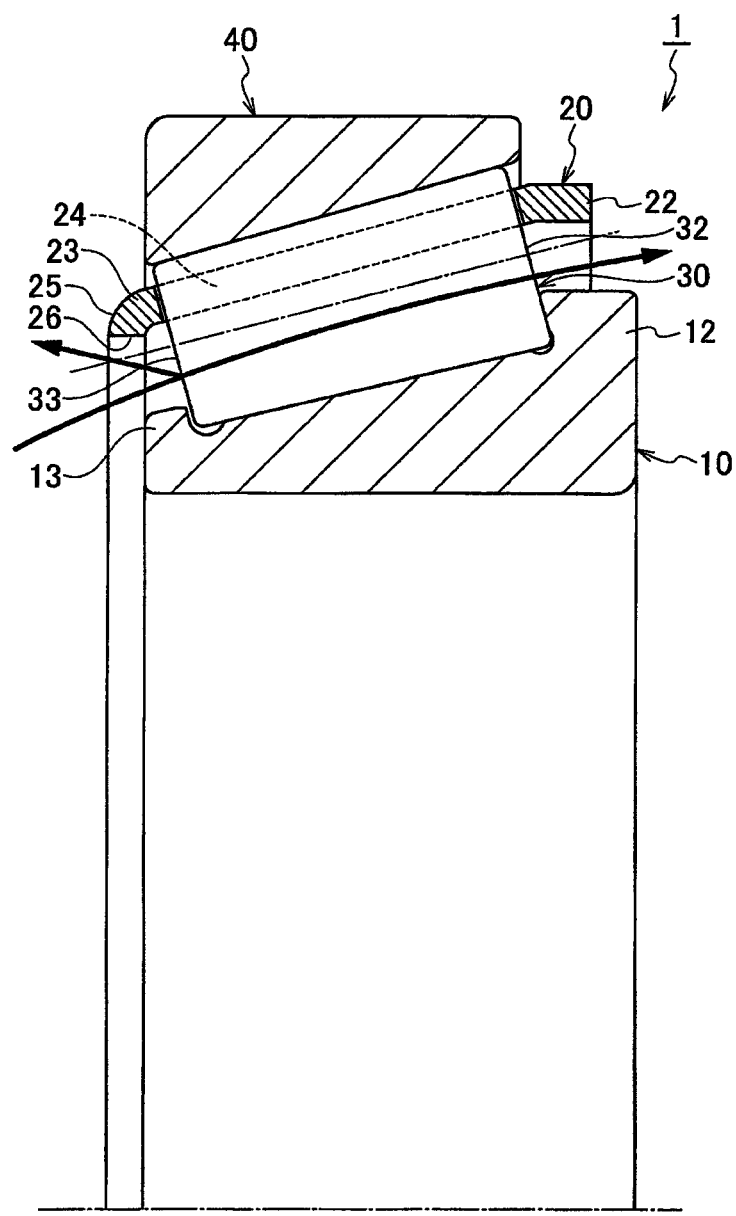
FIG. 6 is a diagram describing a flow of a lubricant in the tapered roller bearing of FIG. 1.

Hence, in the tapered roller bearing 1 of the present embodiment, a curved part 25 with a curved shape extending to the radial inside in a direction away from the bar part 24 is formed in the small-diameter side annular part 23 of the cage 20 as shown in FIG. 6. The curved part 25 is formed short in the radial direction so that a radial end face 26 is located on the radial outside beyond the central axis of the tapered roller 30. That is, an axial cross section of the small-diameter side annular part 23 extends to the radial inside while having curvature so as to project to the radial inside slightly longer than a cross-section thickness of the cage 20. Accordingly, a clearance between the radial end face 26 and the outside surface of the small rib 13 can be increased, with the result that an extra lubricant is discharged from the small-diameter side while introducing the lubricant from the small-diameter side. Consequently, since the tapered roller bearing 1 of the present embodiment can prevent the lubricant from being excessively sucked into the bearing, agitation resistance can be decreased to inhibit heat generation.

Here, heat generation tests were conducted using the conventional tapered roller bearing and the tapered roller bearing 1 according to the present embodiment. In the tests, single row tapered roller bearings (manufactured by NSK, product number HR32017XJ) with an inner ring bore diameter of 85 mm, an outer ring outside diameter of 130 mm and an assembled width of 29 mm having a conventional configuration (the conventional tapered roller bearing) and a configuration of the present embodiment (the tapered roller bearing 1 according to the present embodiment) were used. A radial load of 300 kgf and an axial load of 900 kgf were applied to the conventional tapered roller bearing and the tapered roller bearing 1 of the present embodiment, and operation was conducted in inner ring rotation under forced lubrication by a lubricant (VG68). An operating speed was set at 3000 $min^{-1}$. Then, a temperature of an outer ring after a lapse of a predetermined time was measured as a bearing temperature.

Figure 7:
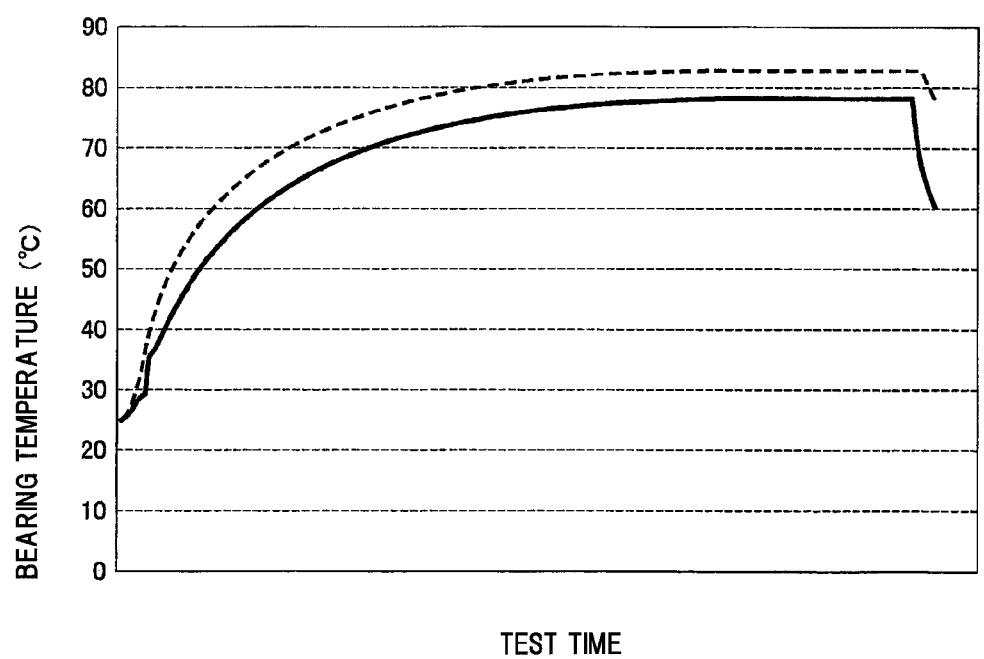
FIG. 7 is a diagram describing results of heat generation tests of the tapered roller bearing according to the first embodiment of the invention and the conventional tapered roller bearing.

FIG. 7 is a graph showing results of the heat generation tests, and a solid line shows the result of the tapered roller bearing 1 according to the present embodiment, and a broken line shows the result of the conventional tapered roller bearing. As is evident from FIG. 7, while the bearing temperature of the conventional tapered roller bearing is 82.5° C., the bearing temperature of the tapered roller bearing 1 according to the present embodiment is 78.1° C. Thus, it is apparent that the tapered roller bearing 1 according to the present embodiment can decrease the bearing temperature by 3 to 5° C. than that of the conventional tapered roller bearing and can obtain an effect of inhibiting heat generation.

According to the tapered roller bearing 1 of the first embodiment thus, easy assembly is enabled without increasing a manufacturing cost.

Second Embodiment

A tapered roller bearing according to a second embodiment of the invention will be described with reference to FIG. 8. In addition, since configurations of an inner ring, a cage and an outer ring are similar to those of the first embodiment, explanation is omitted herein.

In the second embodiment in addition to various configurations of the first embodiment, a tapered roller is formed so that arithmetic average roughness Ra of a rolling surface of the tapered roller becomes 0.05 µm or less. Accordingly, since the rolling surface of the tapered roller becomes smooth and rolling frictional resistance can be decreased, the life of the tapered roller bearing can be increased more.

In order to demonstrate an effect of the tapered roller bearing according to the present embodiment, heat generation tests were conducted using a conventional tapered roller bearing and the tapered roller bearing according to the present embodiment. In the tests, single row tapered roller bearings (manufactured by NSK, product number HR32017XJ) with an inner ring bore diameter of 85 mm, an outer ring outside diameter of 130 mm and an assembled width of 29 mm having a conventional configuration (the conventional tapered roller bearing) and a configuration of the present embodiment (the tapered roller bearing according to the present embodiment) were used. A radial load of 300 kgf and an axial load of 900 kgf were applied to the conventional tapered roller bearing and the tapered roller bearing 1 of the present embodiment, and operation was conducted in inner ring rotation under forced lubrication by a lubricant (VG68). An operating speed was set at 3000 $min^{-1}$. Then, a temperature of an outer ring after a lapse of a predetermined time was measured as a bearing temperature.

Figure 8:
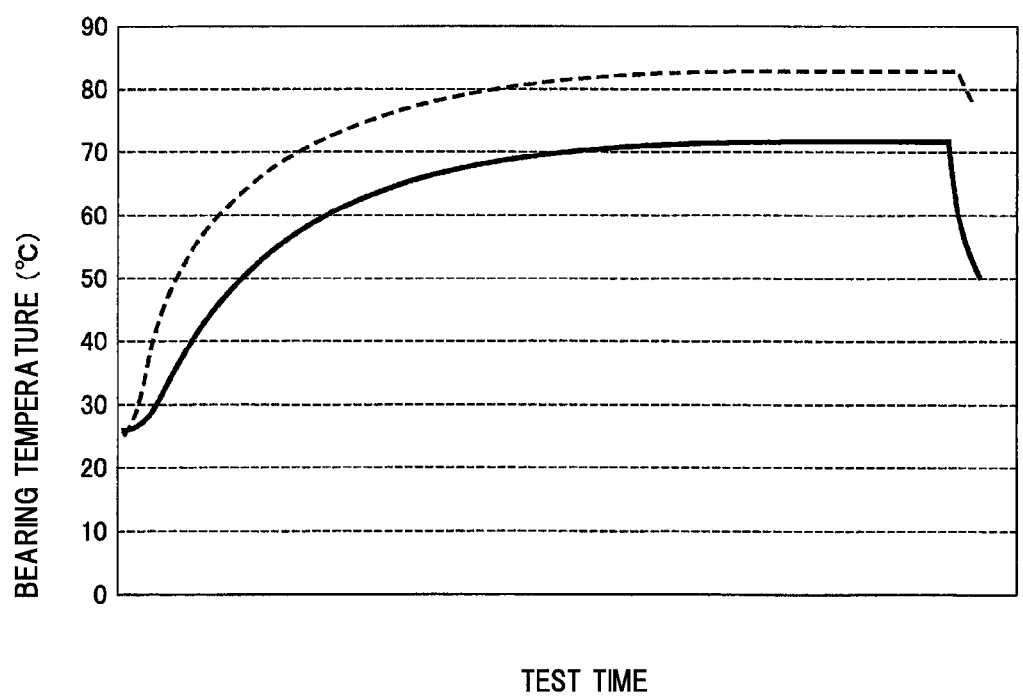
FIG. 8 is a diagram describing results of heat generation tests of a tapered roller bearing according to a second embodiment of the invention and the conventional tapered roller bearing.

FIG. 8 is a graph showing results of the tests, and a solid line shows the result of the tapered roller bearing according to the present embodiment, and a broken line shows the result of the conventional tapered roller bearing. As is evident from FIG. 8, while the bearing temperature of the conventional tapered roller bearing is 82.5° C., the bearing temperature of the tapered roller bearing according to the present embodiment is 71.6° C. Thus, it is apparent that the tapered roller bearing of the present embodiment can decrease the bearing temperature by 8 to 12° C. than that of the conventional tapered roller bearing and can decrease the rolling frictional resistance.

The embodiments and the examples of the invention have been described above, but the invention is not limited to the embodiments described above, and various changes can be made within the scope of the claims. The present application is based on Japanese patent application (patent application No. 2013-012418) filed on Jan. 25, 2013, and Japanese patent application (patent application No. 2013-273050) filed on Dec. 27, 2013, and the contents of the patent applications are hereby incorporated by reference.

INDUSTRIAL APPLICABILITY

The invention can suitably be used as a tapered roller bearing used in general industrial machines or automobiles.

DESCRIPTION OF REFERENCE NUMERALS AND SIGNS

1 TAPERED ROLLER BEARING
10 INNER RING
20 CAGE
22 LARGE-DIAMETER SIDE ANNULAR PART
23 SMALL-DIAMETER SIDE ANNULAR PART
24 BAR PART
25 CURVED PART
26 RADIAL END FACE
30 TAPERED ROLLER

The invention claimed is:

1. A tapered roller bearing comprising:
an inner ring having a small rib in a small-diameter side, the inner ring whose outer peripheral surface is formed with a conical inner ring raceway surface,
an outer ring whose inner peripheral surface is formed with a conical outer ring raceway surface,
plural tapered rollers rollably circumferentially arranged between the inner ring raceway surface and the outer ring raceway surface, and
a cage for holding the tapered rollers by plural pockets formed between a large-diameter side annular part and a small-diameter side annular part arranged in an axial direction, and plural bar parts which axially join the large-diameter side annular part and the small-diameter side annular part and are circumferentially formed at substantially an equal distance,
wherein a value of a ratio of a cross section modulus of the small-diameter side annular part of the cage to a cross section modulus of the large-diameter side annular part of the cage is within range from 0.5 to 1.5 (both inclusive).

2. The tapered roller bearing according to claim 1, wherein the small-diameter side annular part of the cage has a curved part with a curved shape extending to a radial inside in a direction away from the bar part, and
the curved part is configured to be short such that a radial distal end of the curved part does not reach a central axis of the tapered roller in a radial inside direction.

3. The tapered roller bearing according to claim 1, wherein arithmetic average roughness Ra of a rolling surface of the tapered roller is 0.05 µm or less.

* * * * *